United States Patent
Hamajima et al.

(10) Patent No.: US 6,216,003 B1
(45) Date of Patent: Apr. 10, 2001

(54) METHOD OF HANDOVER CONTROL IN MOBILE RADIO COMMUNICATION REALIZING REDUCED CONTROL LOAD

(75) Inventors: Takuya Hamajima; Takaaki Sato, both of Yokosuka; Katsuhiko Yamagata, Yokohama; Takehiro Nakamura, Yokosuka, all of (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/088,715

(22) Filed: Jun. 2, 1998

(30) Foreign Application Priority Data

Jun. 3, 1997 (JP) .................................................. 9-145513

(51) Int. Cl.$^7$ ...................................................... H04Q 7/20
(52) U.S. Cl. ........................... 455/437; 455/443; 455/525; 455/440
(58) Field of Search .................................... 455/436, 437, 455/438, 439, 440, 443, 411, 406, 524, 525; 379/58; 370/337, 331

(56) References Cited

U.S. PATENT DOCUMENTS

| | | | |
|---|---|---|---|
| Re. 36,079 | * 2/1999 | Uddenfeldt et al. | 455/442 |
| 4,955,082 | * 9/1990 | Hattori et al. | 455/437 |
| 5,109,528 | * 4/1992 | Uddenfeldt | 455/442 |
| 5,722,044 | * 2/1998 | Padovani et al. | 455/443 |
| 5,864,760 | * 1/1999 | Gilhousen et al. | 455/442 |
| 5,884,177 | * 3/1999 | Hanley | 455/436 |
| 5,926,470 | * 7/1999 | Tiedemann, Jr. | 455/436 |

FOREIGN PATENT DOCUMENTS

| | | |
|---|---|---|
| 0 647 080 | 4/1995 | (EP) . |
| 95/18513 | 7/1995 | (WO) . |
| 97/08911 | 3/1997 | (WO) . |

* cited by examiner

*Primary Examiner*—Nguyen T. Vo
(74) *Attorney, Agent, or Firm*—Oblon, Spivak, McClelland, Maier & Neustadt, P.C.

(57) ABSTRACT

In the method of handover control, when a mobile station recognizes that the mobile station has moved to an overlapping area, the mobile station notifies this fact to a network side and in response the network side sets up only a communication channel between a handover target base station and an exchange station for controlling that handover target base station, without setting up a radio channel between the handover target base station and the mobile station, while continuing the communication by not releasing the communication channel between the currently located base station and the exchange station and the radio channel between the currently located base station and the mobile station, so that it becomes possible to reduce a transmission control load for transmission between the base station and the exchange station as well as a control load for controlling the exchange station itself.

4 Claims, 4 Drawing Sheets

METHOD OF HANDOVER CONTROL IN MOBILE RADIO COMMUNICATION REALIZING REDUCED CONTROL LOAD

BACKGROUND OF THE INVENTION

1. Field of the Invention

The present invention relates to a method of handover control in a mobile radio communication system in which a service area for supporting a communication with respect to a mobile station is formed by a plurality of radio zones at which a plurality of base stations are distributedly provided respectively, for controlling a handover in the case where a mobile station moves from a currently located radio zone to a neighboring radio zone and a handover in the case of switching a type of channel to be used for the communication with respect to the mobile station.

2. Description of the Background Art

The conventional handover control in the mobile radio communication is realized in such a manner that, when a request for switching a radio channel occurs, this request is notified from a mobile station to a handover target base station or a currently located base station, via the currently located base station and an exchange station for controlling the currently located base station.

However, this conventional handover control is associated with a problem of increasing a transmission control load for transmission between the base station and the exchange station, a control load for controlling the exchange station itself, and a handover control delay.

SUMMARY OF THE INVENTION

It is therefore an object of the present invention to provide a method of handover control in a mobile radio communication which is capable of reducing a transmission control load for transmission between the base station and the exchange station, a control load for controlling the exchange station itself, and a handover control delay.

According to one aspect of the present invention there is provided a method of handover control in a mobile radio communication system in which a service area for supporting a communication with respect to a mobile station is formed by a plurality of radio zones at which a plurality of base stations are distributedly provided respectively, for controlling a handover in which a mobile station moves from a currently located radio zone to a neighboring radio zone, the method comprising the steps of: (a) recognizing at the mobile station a moving from an non-overlapping area of the currently located radio zone and the neighboring radio zone to an overlapping area of the currently located radio zone and the neighboring radio zone within the currently located radio zone, and notifying the moving from the mobile station to a network side; and (b) setting up only a new communication channel between a handover target base station that constitutes the overlapping area and an exchange station for controlling the handover target base station, without setting up a new radio channel between the handover target base station and the mobile station, while continuing the communication by not releasing an original communication channel between a currently located base station and the exchange station and an original radio channel between the currently located base station and the mobile station, at the network side upon receiving a notification of the moving from the mobile station.

According to another aspect of the present invention there is provided a method of handover control in a mobile radio communication system having a mobile station that uses a random access channel and an individual channel switchably, for controlling a handover in which a type of channel to be used for a communication with respect to the mobile station is switched, the method comprising the steps of: notifying a request for switching a radio channel from one of the random access channel and the individual channel to another one of the random access channel and the individual channel, the request being notified directly from the mobile station to a currently located base station without utilizing a transmission via an exchange station for controlling the currently located base station; and setting up said one of the random access channel and the individual channel with respect to the mobile station while releasing said another one of the random access channel and the individual channel, at the currently located base station upon receiving the request from the mobile station.

Other features and advantages of the present invention will become apparent from the following description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DETAILED DESCRIPTION OF THE PREFERRED EMBODIMENTS

Figure 1:
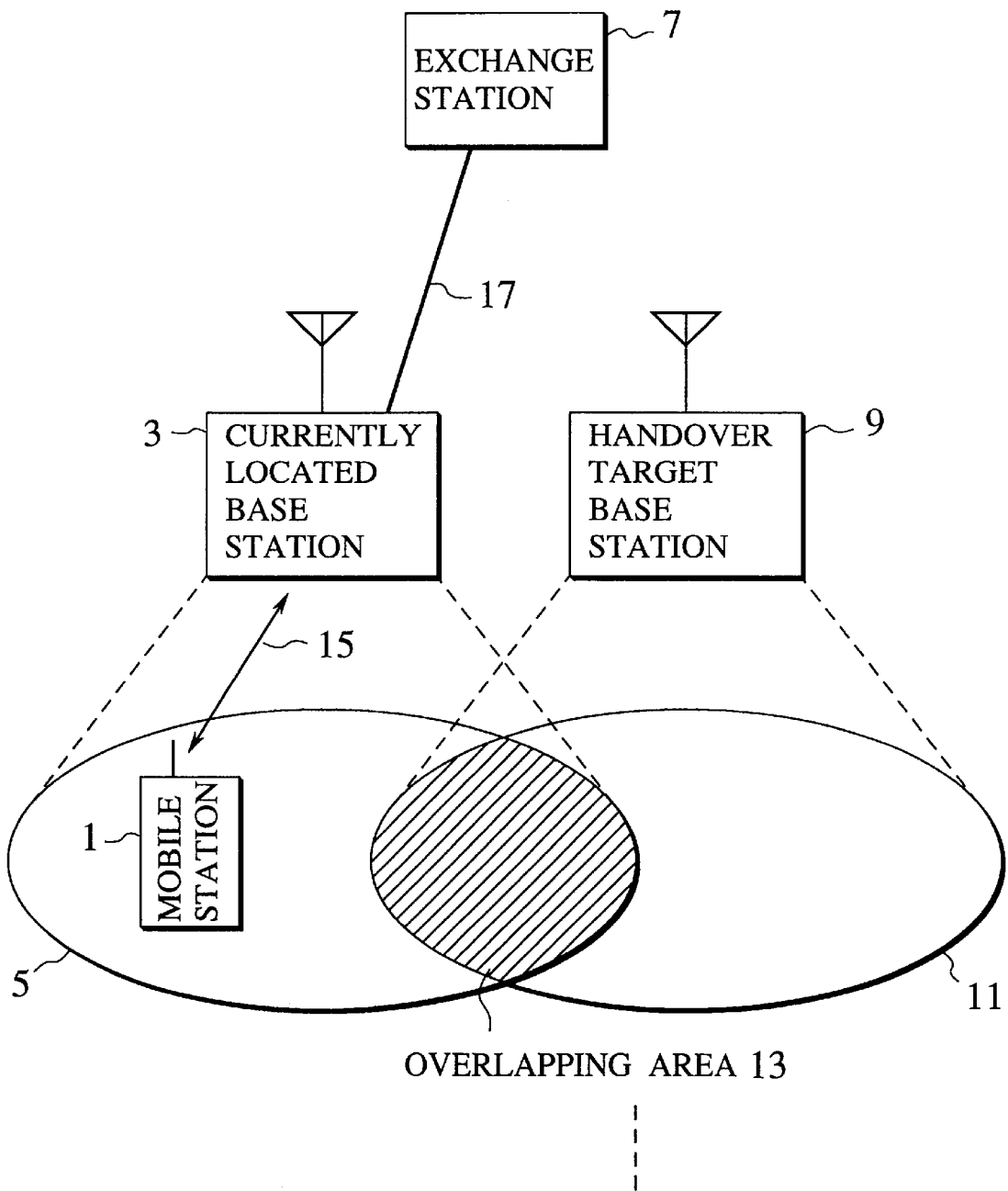
FIG. 1 is a schematic diagram of a mobile radio communication system for realizing a handover control method according to one embodiment of the present invention, in a state before a mobile station enters an overlapping area.

Referring now to the drawings, wherein like reference numerals designate identical or corresponding parts throughout the several views, and more particularly to FIGS. 1–4 thereof, there are illustrated exemplary embodiments of the present invention.

Figure 2:
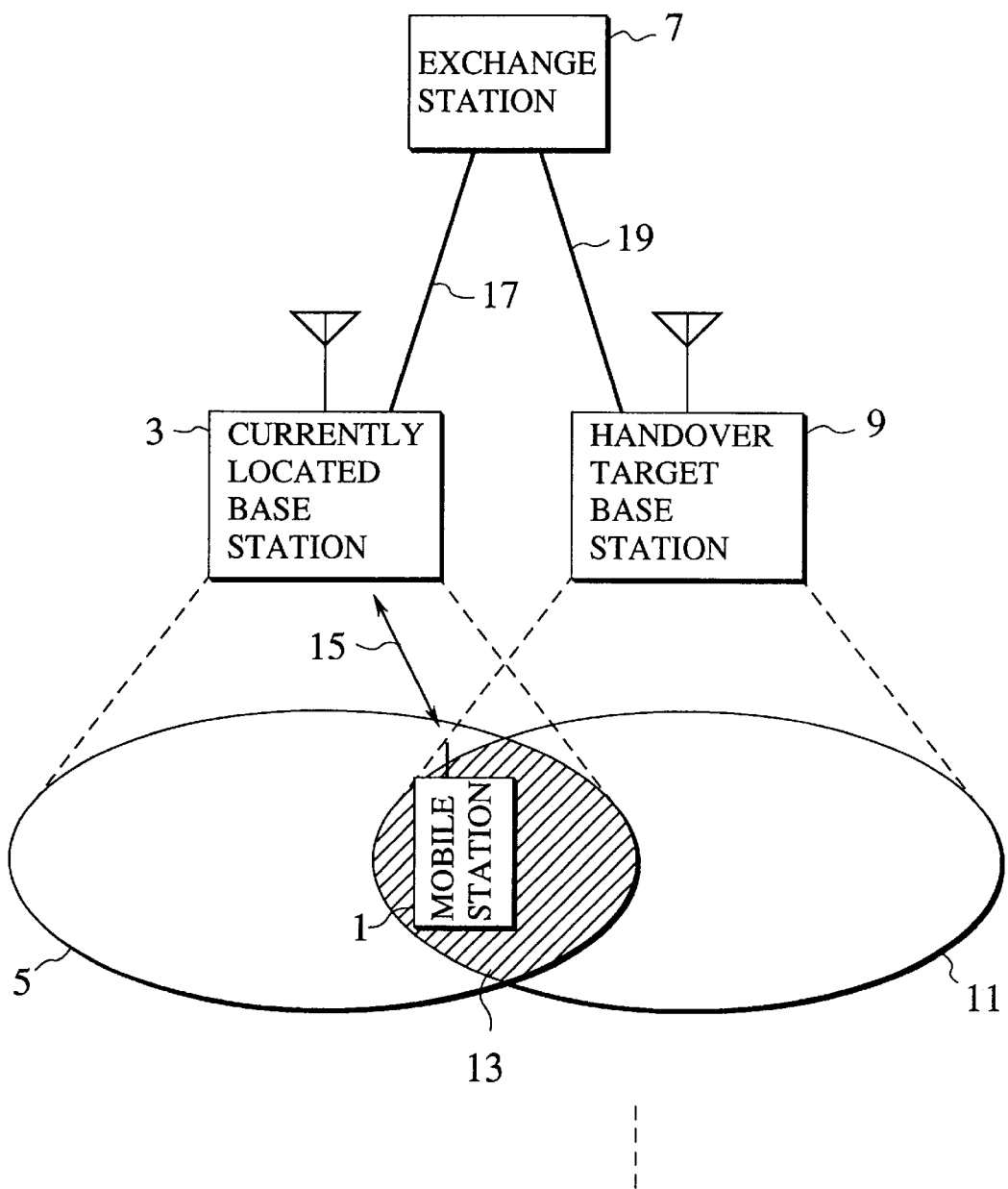
FIG. 2 is a schematic diagram of a mobile radio communication system for realizing a handover control method according to one embodiment of the present invention, in a state in which a mobile station just enters an overlapping area.
Figure 3:
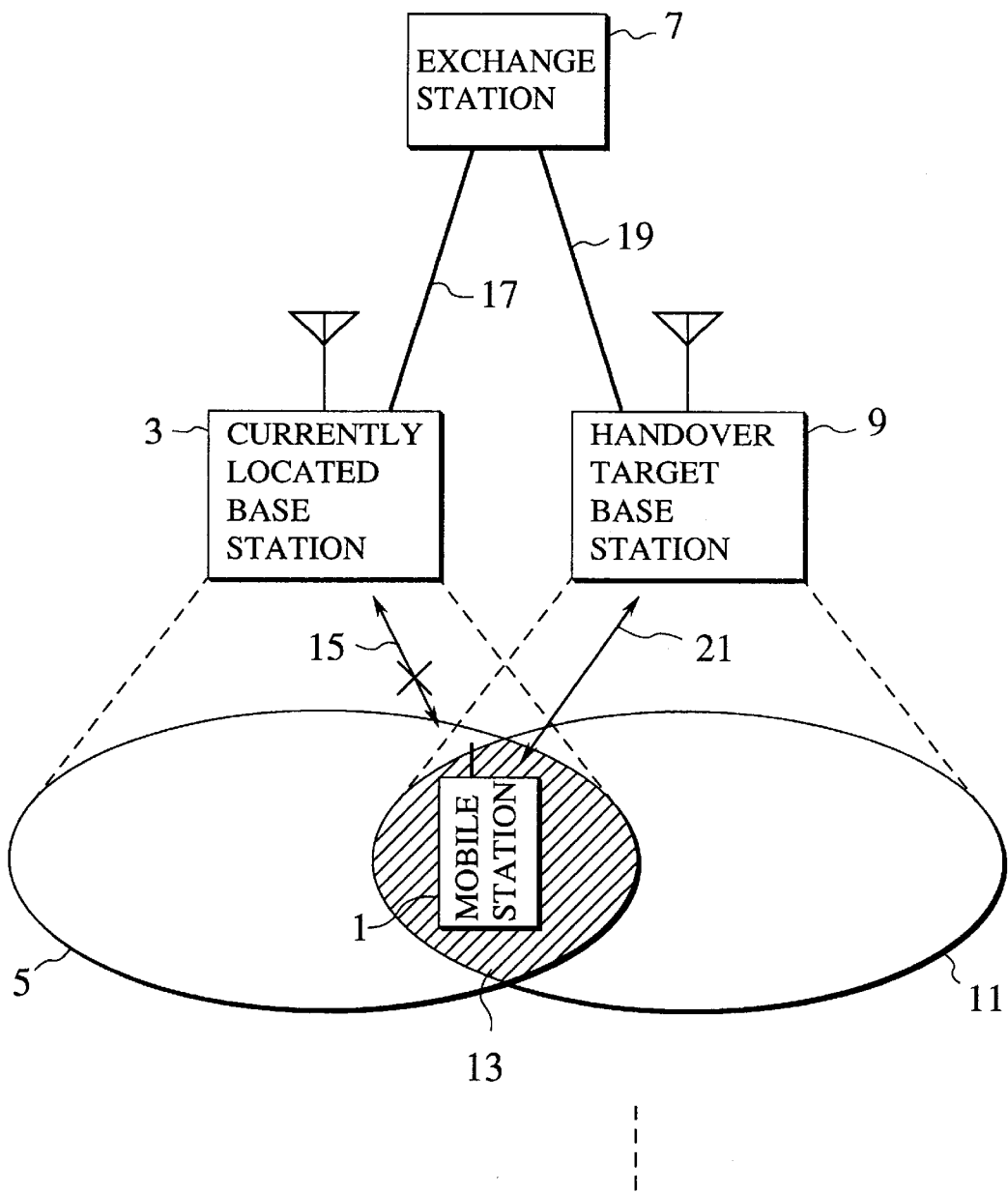
FIG. 3 is a schematic diagram of a mobile radio communication system for realizing a handover control method according to one embodiment of the present invention, in a state in which a request for switching a radio channel occurs at a mobile station.

Referring now to FIG. 1 to FIG. 3, one embodiment of a handover control method according to the present invention will be described.

FIG. 1 to FIG. 3 show a mobile radio communication system which realizes the handover control method of this embodiment.

First, in FIG. 1, a mobile station 1 is currently located in a radio zone 5 under a currently located base station 3 and communicating with the currently located base station 3 through a radio channel 15, while the currently located base station 3 is connected with an exchange station 7 through a communication channel 17. In this state, the mobile station 1 has not yet entered into an overlapping area 13 between the radio zone 5 and a neighboring radio zone 11 under a handover target base station 9.

When the mobile station 1 moves from a state shown in FIG. 1 into the overlapping area 13 as shown in FIG. 2, the mobile station recognizes this state and notifies this fact to a network side. At the network side, upon receiving this notification, a communication channel 19 alone is set up between the handover target base station 9 and the exchange station 7 for controlling the handover target base station Also, in this case, the handover target base station 9 acquires a logical number unique within the handover target base station 9 for the purpose of identifying the mobile station 1 at the handover target base station 9, and notifies this logical number to the mobile station 1 via the exchange station 7 and the currently located base station 3.

Then, when the mobile station 1 moves more deeply into the overlapping area 13 as shown in FIG. 3 and a request for switching a radio channel occurs at the mobile station 1, this request is directly notified from the mobile station 1 to the handover target base station 9 by sending the logical number so as to set up a radio channel 21 between the mobile station 1 and the handover target base station 9, while the radio channel 15 between the mobile station 1 and the currently located base station 3 is released.

Here, in order to establish a relationship of the radio channel 21 between the mobile station 1 and the handover target base station 9 with the communication channel 19 between the handover target base station 9 and the exchange station 7, the mobile station 1 notifies the logical number to the handover target base station 9. Upon receiving this notification, the handover target base station 9 connects the radio channel 21 and the communication channel 19 according to the logical number as managed therein.

According to this handover control, it is possible to switch the radio channel without sending signals through the currently located base station 3 and the exchange station 7, so that it is possible to reduce the channel control load within the network as well as the handover control delay.

It is to be noted here that this handover control method is generally applicable to the case in which a request for switching the radio channel to that of a base station that is constituting the overlapping area occurs at the mobile station while the mobile station is located In the overlapping area.

As described, according to the handover control method of this embodiment, when the mobile station recognizes that it has moved to an overlapping area, the mobile station notifies this fact to the network side and in response the network side sets up only a communication channel between the handover target base station and the exchange station for controlling that handover target base station, without setting up a radio channel between the handover target base station and the mobile station, while continuing the communication by not releasing the communication channel between the currently located base station and the exchange station and the radio channel between the currently located base station and the mobile station, so that it becomes possible to reduce a transmission control load for transmission between the base station and the exchange station as well as a control load for controlling the exchange station itself.

In addition, according to the handover control method of this embodiment, when a request for switching the radio channel to that of a base station that is constituting the overlapping area occurs at the mobile station while the mobile station is located in the overlapping area, the mobile station directly notifies this request to a handover target base station, without utilizing a transmission via the currently located base station, so that it becomes to reduce a transmission control load for transmission between the base station and the exchange station, a control load for controlling the exchange station itself, and a handover control delay.

Figure 4:
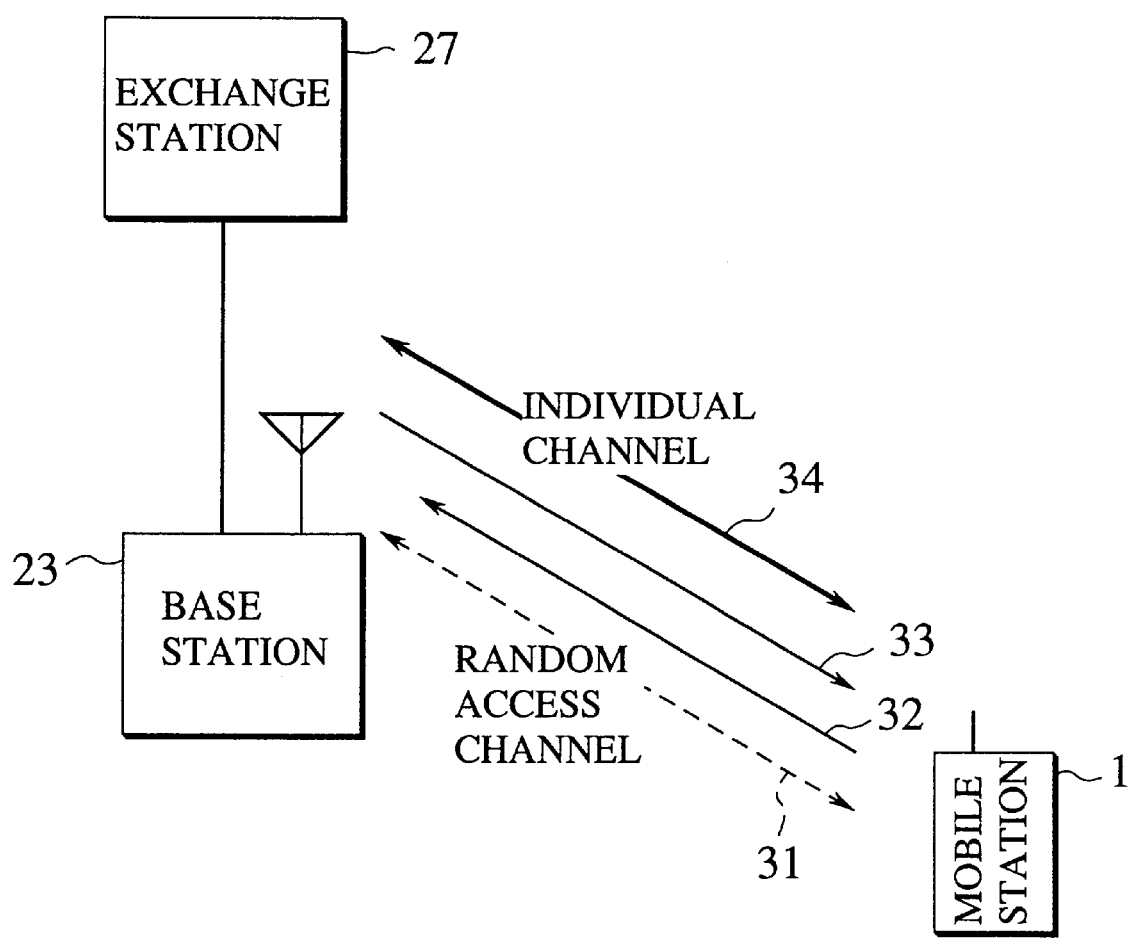
FIG. 4 is a schematic diagram of a mobile radio communication system for realizing a handover control method according to another embodiment of the present invention, in a state in which a request for switching a type of channel to be used occurs at a mobile station.

Referring now to FIG. 4, another embodiment of a handover control method according to the present invention will be described.

FIG. 4 shows a mobile radio communication system which realizes the handover control method of this embodiment, in a state in which the mobile station 1 is carrying out the communication using a random access channel 31.

In this state, when a request for switching to an individual channel 34 occurs, the mobile station notifies this fact directly to a currently located base station 23, as indicated by an arrow 32. Upon receiving this notification, the currently located base station 23 returns a response to the mobile station 1 as indicated by an arrow 33, and sets up the individual channel 34 between the mobile station 1 and the currently located base station 23 while releasing the random access channel 31. Thus this radio channel switching control is realized without utilizing a transmission via an exchange station 27.

It is to be noted that the switching from the individual channel to the random access channel can be also realized similarly.

As described, according to the handover control method of this embodiment, in the mobile station that uses the random access channel and the individual channel switchably, the radio channel can be switched only by a negotiation between the base station and the mobile station without utilizing a transmission via the exchange station for controlling the base station, so that it becomes to reduce a transmission control load for transmission between the base station and the exchange station, a control load for controlling the exchange station itself, and a handover control delay.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of handover control, in a mobile radio communication system in which a service area for supporting a communication with respect to a mobile station is formed by a plurality of radio zones in which a plurality of respective base stations are provided, for controlling a handover in which a mobile station moves from a currently located radio zone to a neighboring radio zone, the method comprising the steps of:

(a) recognizing at the mobile station a movement from a non-overlapping area of the currently located radio zone and the neighboring radio zone to an overlapping area of the currently located radio zone and the neighboring radio zone within the currently located radio zone, and notifying of the movement to a network side by the mobile station;

(b) setting up only a new communication channel between a handover target base station that constitutes the overlapping area and an exchange station for controlling the handover target base station, without setting up a new radio channel between the handover target base station and the mobile station, while continuing the communication by not releasing an original communication channel between a currently located base station and the exchange station and an original radio channel between the currently located base station and the mobile station, at the network side, upon receiving a notification of the movement from the mobile station; and (c) notifying of a request for switching a radio channel from the original radio channel to the new radio channel, directly from the mobile station to the handover target base station without utilizing a transmission via the currently located base station, when the request occurs at the mobile station and while the mobile station is located in the overlapping area.

2. The method of claim 1, further comprising the step of:

(d) setting up the new radio channel and connecting the new radio channel with the new communication channel, while releasing the original communication channel, at the network side, upon receiving the request from the mobile station.

3. The method of claim 2, further comprising the step of:

(e) notifying of a logical number for uniquely identifying the mobile station within the handover target base station, by the handover target base station to the mobile station via the currently located base station and the exchange station, upon receiving the notification of the movement from the mobile station, wherein the step (c) notifies of the request by using the logical number, and the step (d) connects the new radio channel with the new communication channel according to the logical number, as notified by the step (c).

4. A method of handover control, in a mobile radio communication system having a mobile station that uses a random access channel and an individual channel in a switched manner, for controlling a handover in which a type of channel to be used for a communication with respect to the mobile station is switched, the method comprising the steps of:

notifying of a request for switching a radio channel from one of the random access channel and the individual channel to another one of the random access channel and the individual channel, the request being notified directly from the mobile station to a currently located base station without utilizing a transmission via an exchange station for controlling the currently located base station; and setting up said one of the random access channel and the individual channel with respect to the mobile station, while releasing said another one of the random access channel and the individual channel, at the currently located base station, upon receiving the request from the mobile station.

* * * * *